United States Patent [19]

Bentley

[11] Patent Number: 5,249,078
[45] Date of Patent: Sep. 28, 1993

[54] SUN VISOR

[75] Inventor: William H. Bentley, Wyomissing, Pa.

[73] Assignee: American Polarizers, Inc., Reading, Pa.

[21] Appl. No.: 692,197

[22] Filed: Apr. 26, 1991

Related U.S. Application Data

[63] Continuation-in-part of Ser. No. 503,749, Apr. 3, 1990, Pat. No. 5,115,341.

[51] Int. Cl.⁵ .............................................. G02B 5/30
[52] U.S. Cl. .................................... 359/493; 296/97.6
[58] Field of Search ............. 359/493; 296/97.6, 97.7, 296/97.8

[56] References Cited

U.S. PATENT DOCUMENTS

| | | | |
|---|---|---|---|
| 2,526,889 | 10/1950 | McComb | 359/493 |
| 2,856,810 | 10/1958 | Frost | 359/493 |
| 2,915,937 | 12/1959 | Winchell | 359/493 |
| 3,635,543 | 1/1972 | Collins | 350/159 |

Primary Examiner—Mark Hellner
Attorney, Agent, or Firm—Eugene E. Renz, Jr.

[57] ABSTRACT

A sun visor device for use in the cockpit of aircraft, comprising an optically active visor movably mounted in operable relationship with the windshield in the cockpit. The visor is polarized in the vertical plane and has a pair of polarized disks movably mounted on the visor to permit rotational movement for relative rotation between the vertical and horizontal polarization positions.

9 Claims, 4 Drawing Sheets

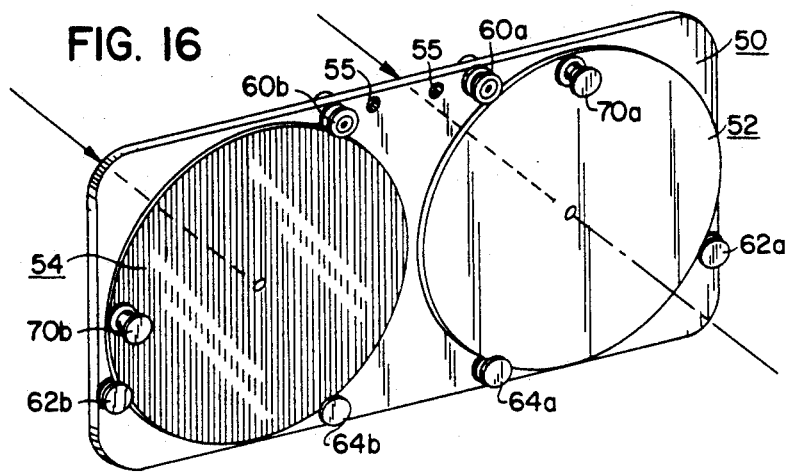
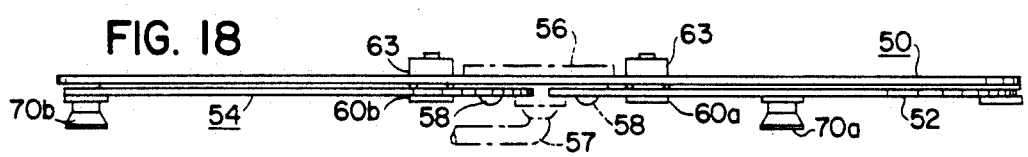
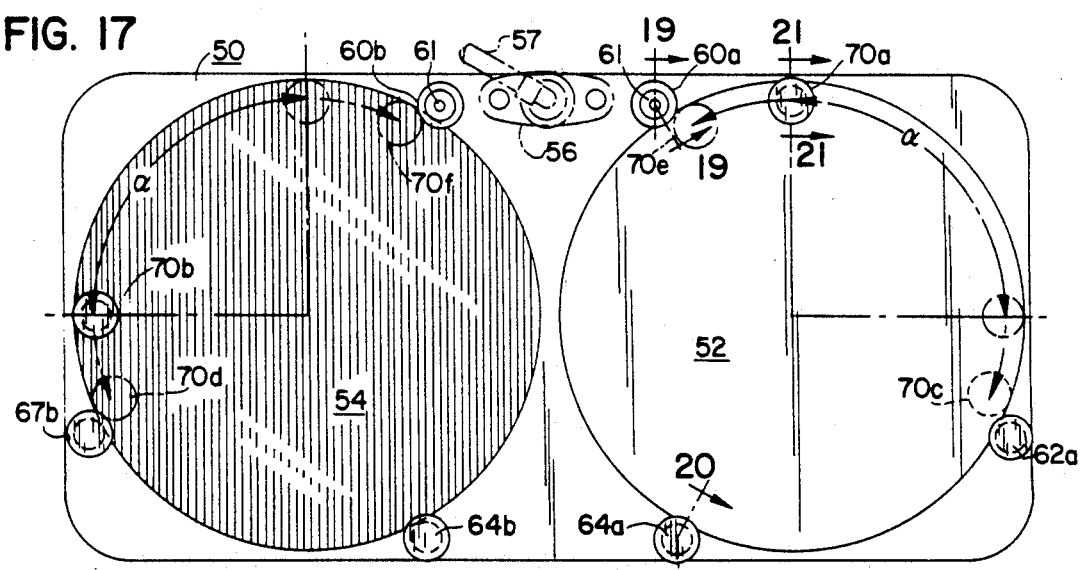
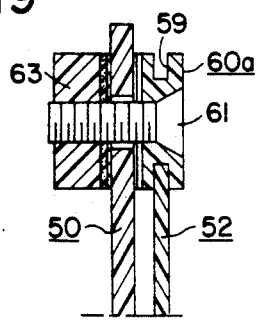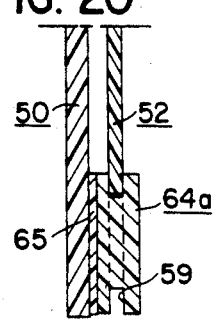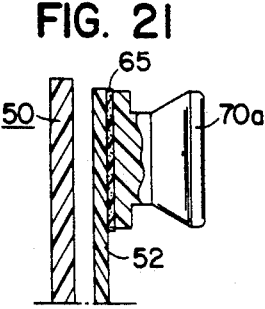

SUN VISOR

CONTINUING DATA

This is a continuation in part of a prior application for Sun Visor, Ser. No. 07/503,749, filed on Apr. 3, 1990 now U.S. Pat. No. 5,115,341 issued Oct. 22, 1991.

FIELD OF THE INVENTION

The present invention relates to sun visors for use in the cockpit of aircraft. More particularly, the invention relates to a new and useful sun visor which is particularly designed to substantially protect the pilot from visual aberrations or blind spots caused by the sun.

BACKGROUND OF THE INVENTION

Sun glare and visual aberrations or blind spots have been a concern for air safety as long as the aviation industry has existed. Efforts to eliminate or materially reduce adverse effects of the sun have been at best only partially successful.

Sun visors and sun glasses are, of course, the most practical way to reduce or eliminate visual problems caused by sunlight. However, as much as it is desirable to reduce sun glare, it is even more important that vision not be obstructed. Sun visors and sun glasses are effective in reducing the amount of sun, by reducing natural incident light to a third or less of the light which enters the windshield of the aircraft. For that reason, sun visors and sunglasses have been used to reduce the effects of sunlight on the pilot.

However, sun visors and sunglasses have not been successful in reducing blind spots or temporary visual aberrations caused by looking directly into the sun, such as occurs when the aircraft is being flown "up sun" or in the general direction of the sun. This temporary blind spot or visual aberration lasts for from mere seconds to several minutes, depending upon the intensity of the sun and the effectiveness of first order sun visors or sunglasses which are being used by the pilot. Since this often times happens during the busy time, during landing or takeoff, when the direction of flight is governed much more by wind direction and runway layout than it is by the location of the sun in the sky, even short moments of loss of full vision can be extremely dangerous.

Efforts to block the light of the sun so that it does not directly shine on the pilot's eyes have not met with any significant success. Since the sun is the brightest object which a pilot will encounter, total obstruction of the sun's rays by visors would dangerously reduce the field of view of the pilot. Danger during landing and taking off, as well as the risk of mid-air collisions, would be far greater than the danger caused by momentary blind spots or visual aberrations from the sun. Thus, the solution would be worse than the problem.

At the present time, no effective way to reduce the dangers from temporary sun blindness has been found which does not reduce the pilot's field of vision to an unsafe level.

Accordingly, it is an object of the present invention to provide a device which is useful for restricting or eliminating the danger of a pilot having to view the sun directly.

Another object of this invention is to provide a device suitable for eliminating or reducing the danger from direct sunlight without restricting the field of vision of the pilot. Other objects will appear hereinafter.

SUMMARY OF THE INVENTION

It has now been discovered that the above and other objects of the present invention may be accomplished in the following manner. Specifically, a sun visor device has been developed which is capable of preventing dangerous sun glare which can cause visual aberrations or blind spots and yet the device does not significantly reduce the field of vision of the pilot.

The device comprises an optically active visor movably mounted in operable relationship to the windshield of a cockpit of an aircraft. The visor is polarized in the vertical plane. Also provided are a pair of polarized disks which are movably mounted on the visor to permit both linear movement for positioning the disks and rotational movement for selective rotation between vertical and horizontal polarization positions.

As will be noted herein below, when one or both of the disks are rotated to the vertical polarization position, they function substantially the same as the visor, allowing essentially one hundred percent (100%) of the field of vision available to the pilot without the sun visor. The polarized visor will thus be effective in reducing or eliminating sudden glare from reflected light, such as reflecting from water or shiny aircraft parts and the like. When one or both of the disks are rotated to the horizontal polarization position, effectively all of the light through the disks will be absorbed, thereby reducing the field of vision but only by the size of the disk or disks.

In a preferred embodiment, the disks are sized to occlude from about 4° to about 10° of the line of sight of a pilot, and preferably from about 5° to about 7°. Dimensionally, this means that each disk will nominally be about approximately five inches in diameter when the disk is nominally about twenty inches from the pilot's eyes.

In a preferred embodiment, the visor has a substantial horizontal length to width ratio to accommodate both disks, such as where the visor is in the shape of rectangle. Knobs are provided to facilitate rotation of the disks with respect to the visor.

When two diametrically opposed knobs are used to facilitate the rotation of a disk, the knobs can be positioned to prevent rotation beyond a 90° span from vertical to horizontal. Thus, the disk will have stops which provide the maximum and the minimum degree of polarization so that the pilot can quickly adjust the visor as needed, using one hand.

BRIEF DESCRIPTION OF THE DRAWINGS

These and other objects of the present invention and the various features and details of the operation and construction thereof are hereinafter more fully set forth with reference to the accompanying drawings, where:

FIG. 16 is a perspective view of the preferred embodiment of the sun visor constructed in accordance with the present invention;

FIG. 17 is a front elevational view of the sun visor shown in FIG. 16;

FIG. 18 is a top plan view of the sun visor assembly shown in FIG. 17; and

FIGS. 19, 20 and 21 are enlarged fragmentary sectional views taken on lines 19—19, 20—20, and 21—21, respectively, of FIG. 17.

DETAILED DESCRIPTION OF THE PREFERRED EMBODIMENT

Figure 1:
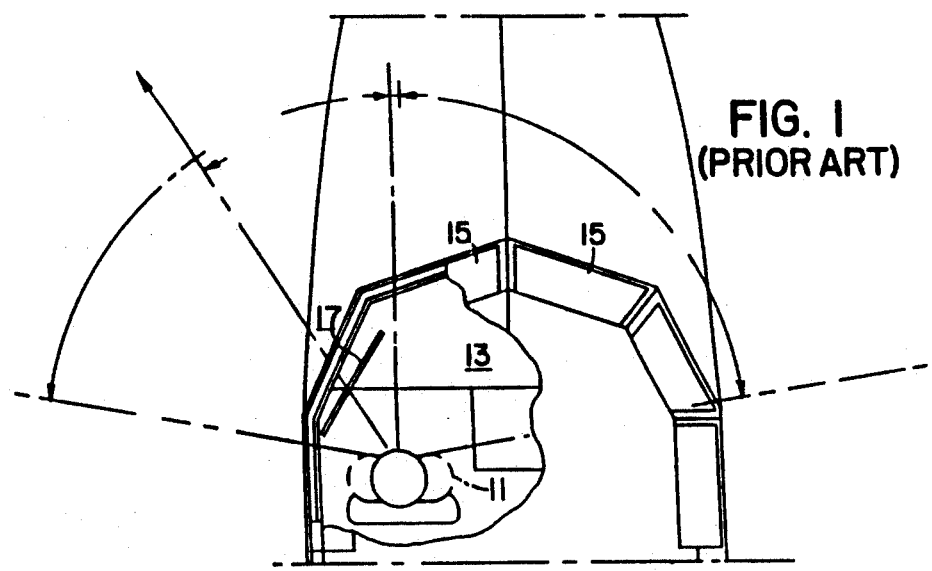
FIG. 1 is a fragmentary, schematic plane view of the forward portion of an aircraft fuselage, including the cockpit and associated windshields.
Figure 2:
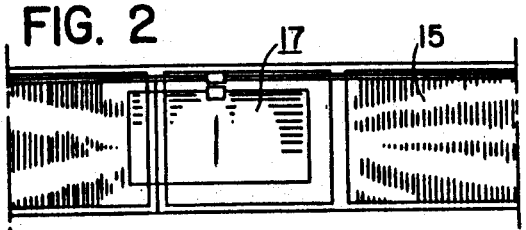
FIG. 2 is a fragmentary development of the left quadrant scanned by the pilot of FIG. 1 and showing the positioning of a conventional sun visor and designated as prior art.
Figure 3:
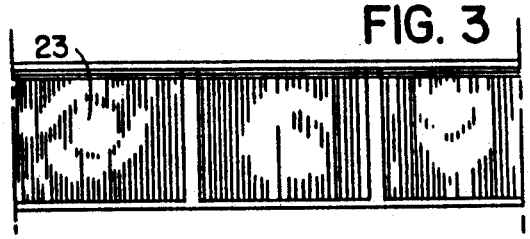
FIG. 3 is a view similar to FIG. 2, but showing the right quadrant scanned by the pilot after having glanced towards the sun, creating visual aberrations or blind spots, again designated prior art.

As shown in FIG. 1, and which is designated as prior art, a pilot 11 is located in a cockpit 13 of an aircraft, and an arbitrary sun bearing is located in the left quadrant. The pilot has visual access through the various windshields 15 and can scan the field of vision from the right quadrant to the left quadrant. Because of the location of the sun, a conventional sun visor 17 is positioned in the field of view in the left quadrant scan.

The sun visor 17 which has been used by the prior art may be of several conventional forms. In one case, sun visors are solid and transmit no light, such as the sun visors used in automobiles. These have not been used in aircraft, however, because too large a field of view is obscured. Alternatively, the sun visor 17 may be made from a light filtering medium, such as a polarized ultraviolet sun visor which reduces a substantial amount of glare and which significantly reduces the amount of light transmitted through the visor while still permitting sufficient light so that objects can be identified. For example, it would still be possible to see another aircraft through a conventional sun visor because less than two thirds of the natural incident light is absorbed.

However, when the sun is viewed through a conventional ultraviolet sun visor, even the reduced amount of light which is transmitted by the sun visor can produce temporary visual aberrations or blind spots. A quick glance at the sun through the sun screen can cause a temporary blind spot or latent image when the pilot continues to scan. This is of particular concern during landing or takeoff, and when other aircraft are known to be present, such as, for example, in landing patterns and holding patterns at busy airports.

Figure 4:
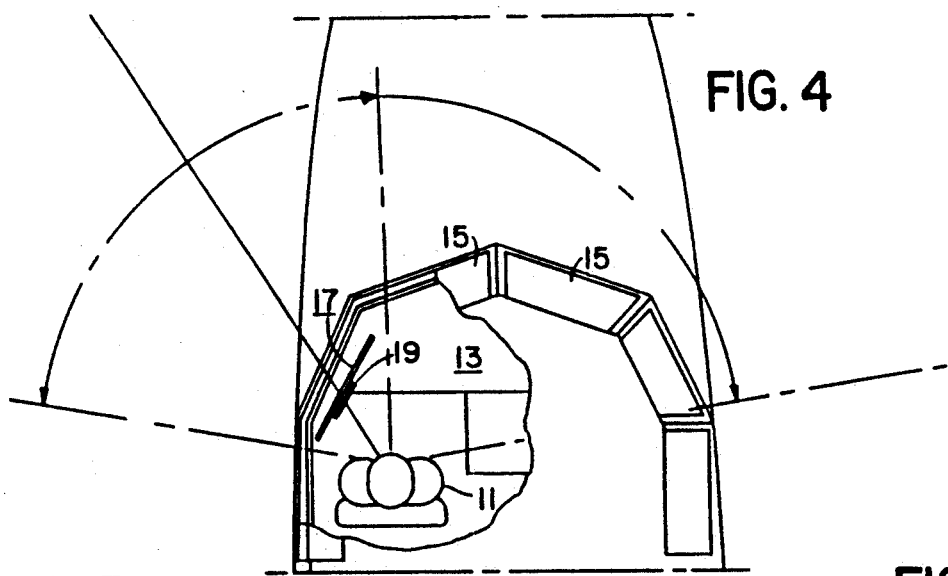
FIG. 4 is a schematic view similar to FIG. 1, but showing a polarized sun visor equipped with the adjustable analyzer disk of the present invention.
Figure 5:
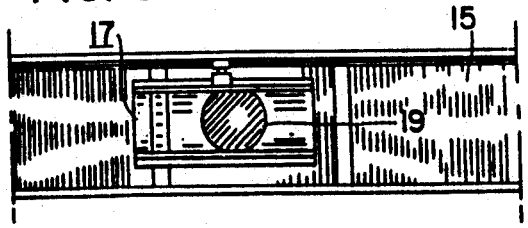
FIGS. 5 and 6 are schematic developments of the left and right windshield quadrants similar to FIGS. 2 and 3 but showing the effectiveness of the present invention.
Figure 6:
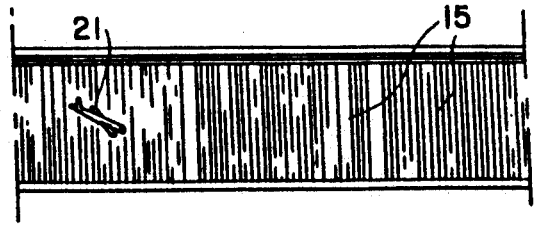

Shown in FIG. 4 is a similar pilot and cockpit arrangement with the same set of windshields and sun visor of the present invention. Visor 17, which is polarized as described hereinafter, is provided with an analyzer disk 19 which is effective in blocking out the sun when the pilot 11 scans in the left quadrant, thereby eliminating blind spots or latent images as shown in FIG. 6. Thus, because of the combination of the sun visor 17 and analyzer disk 19, the aircraft 21 is visible in accordance with principles of the present invention and the flight safety is significantly enhanced. In the prior art, instead of the aircraft 21, a latent image 23 would be seen by the pilot in the windshield 15, which would be clearly an unsafe condition.

Figure 9:
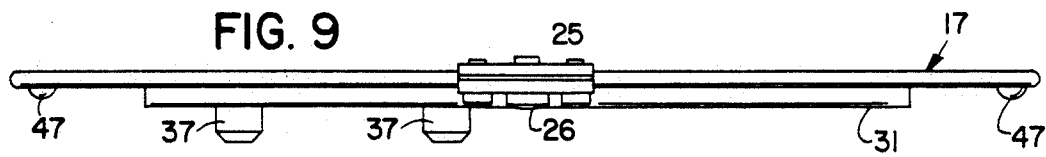
FIG. 9 is a plane view of the assembly shown in FIG. 8.

The device of the present invention comprises a sun visor device for use in the cockpit of aircraft. This device, shown generally in FIGS. 7 through 9, comprises an optically active visor 17 which may be movably mounted in an operable relationship to the windshield of the aircraft. The visor 17 is polarized in one axial plane, either horizontal or, preferably, the vertical plane as is conventional, and substantially reduces the glare caused by reflection and general natural light which passes through windshield 15. The device also includes polarized disk 19 which is movably mounted on visor 17 to permit both linear movement for positioning disk 19 and for rotational movement for selectively rotating between a 90° relationship with the plane of visor 17, such as between a vertical and a horizontal polarization position.

One particularly advantage of the present invention is that it is capable of being installed in existing aircraft without modification of the air mainframe. Therefore, it is much simpler to obtain certification for use of the device by the Federal Aviation Administration. One simple way for mounting visor 17 to the aircraft is by the use of clamp 25 and screw 26 which can be tightened to close gap 27 to thereby movably mount the visor.

Figure 7:
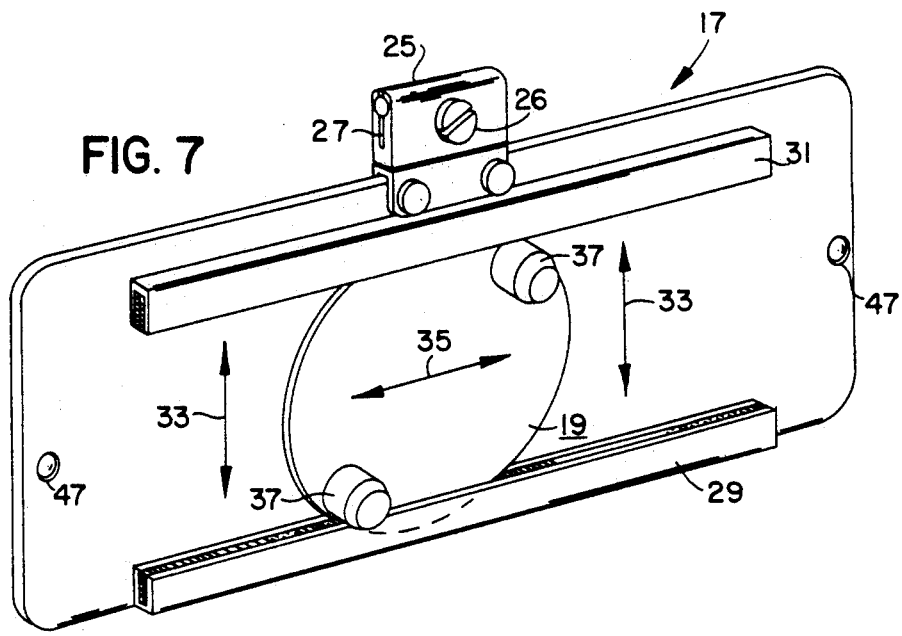
FIG. 7 is a perspective view of the sun visor of the present invention.
Figure 8:
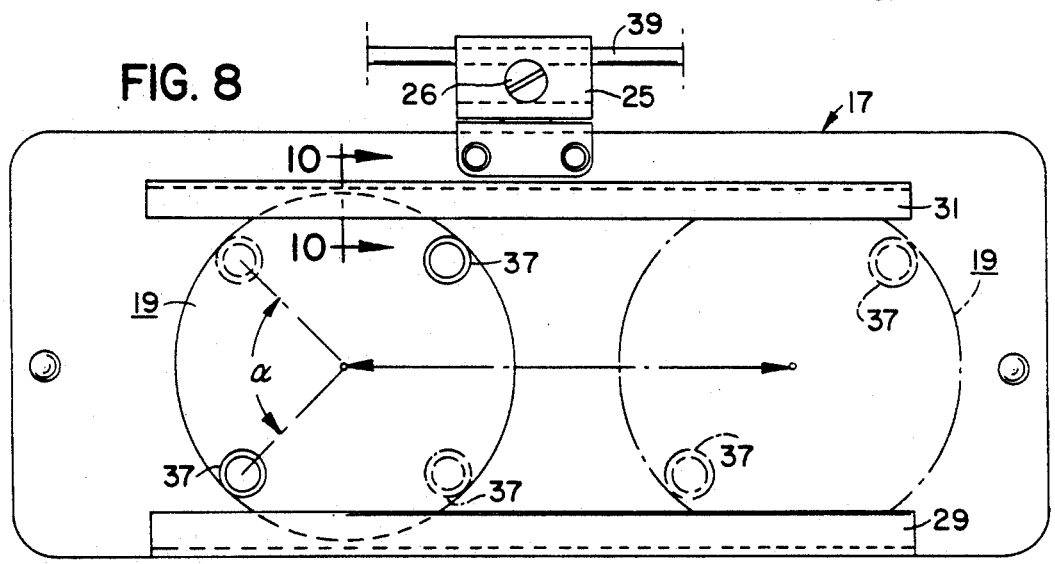
FIG. 8 is a front elevational view of the sun visor as shown in FIG. 7.

The disk 19 is shown in FIGS. 7 and 8 as being movably mounted between lower track 29 and upper track 31. The distance between tracks 29 and 31 is substantially equal to the diameter of disk 19, so that the disk 19 can be moved longitudinally along the length of the rectangular sun visor 17 to be positioned in visual alignment with the location of the sun. Because visor 17 has been polarized in the vertical direction of plane, natural incident light is only transmitted in the direction shown by arrows 33. Thus a significant amount of incident light is already reduced, taking away glare and other forms of brightness.

In a preferred embodiment, disk 19 is sized to occlude from about 4° to about 10° of the line of sight of pilot 11, and preferably from about 5° to about 7°. Dimensionally, this means that disk 19 will nominally be about approximately five inches in diameter when disk 19 is nominally about twenty inches from the pilot eyes.

In order to prevent the sun from causing blind spots or visual aberrations, however, it is necessary to further decrease the amount of light transmitted to the pilot's eyes. This is done by rotating disk 19 so that its position of polarization is horizontal, as shown by arrow 35. In this manner, the maximum amount of light is absorbed by visor 17 and disk 19 and scanning directly into the sun will not cause a noticeable visual aberration or blind spot. Because disk 19 can be rotated to adjust the orientation of the polarization plane, when there is no danger of direct visual line of sight with the sun, disk 19 can be rotated by using diametrically opposed knobs 37 to align the polarization of disk 19 with the polarization in the vertical plane of visor 17. As can be appreciated, when the pilot changes direction, a simple one hand operation can rotate polarization orientation 35 of disk 19 by manipulation of diametrically opposed knobs 37.

As has been previously stated, the device of the present invention is attached to cockpit of the airplane as a replacement visor for conventional visors which may be attached to rod 39, for example, so that by placing sufficient tension on screw 26, gap 27 is narrowed and rod 39 movably supports the visor at whatever position is desired.

Both visor 17 and rotatable disk 19 can be made from any of the conventional polarized materials. For example, polarizing films such as cellulose acetate butyrate may be sandwiched between acrylic lamina to provide polarized materials. The thickness of visor 17 or disk 19 has no material effect upon the visual properties of the device. The thickness should be sufficient to provide structural integrity as well as aesthetic appeal. In a preferred embodiment, rotating knobs 37 are black or opaque, to prevent distortion. In the alternative, clear knobs can be used as long as the junction between knob 37 and disk 19 is opaque. Knobs 37 are sufficiently small so that they do not present a visual obstruction to the pilot.

As shown in FIG. 8, clamp 25 is fastened to rod 39 which is part of the airplane structure. Since visor 17 is clamped by clamp 25 to the aircraft at rod 39, no modification of the aircraft is necessary. Accordingly, a supplemental certification of this device for each make and model of aircraft can be accomplished simply without major bureaucratic involvement.

Visor 17 contains tracks 29 and 31 which can be fastened with an adhesive, generally as shown in FIG. 8. Polarized disk 19 is held between tracks 29 and 31 and is free to move both laterally and rotationally as previously described.

Figure 10:
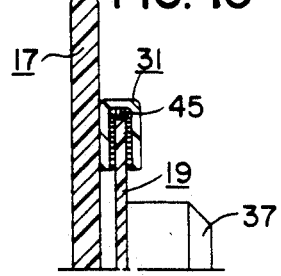
FIG. 10 is an enlarged fragmentary sectional view taken along the line 10—10 of FIG. 8 showing one embodiment of the track of the present invention.
Figure 11:
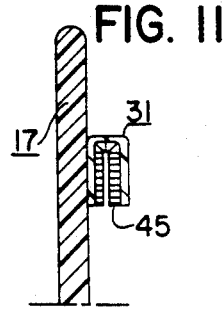
FIG. 11 is similar to FIGS. 10, but with the disk removed.
Figure 12:
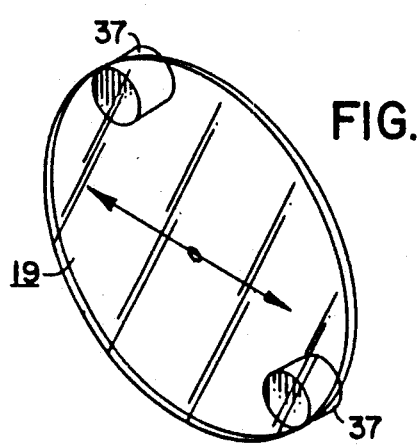
FIG. 12 is perspective view of the disk of the present invention, showing diametrically opposed knobs mounted thereon.

In the preferred embodiment, shown in FIGS. 10 and 11, a material 45 is placed in track 31 as shown and in track 29, not shown. One material which has been found to be particularly suitable and preferred is polyester velvet fabric. Velvet is a fabric which has a short, soft, dense warp pile, in which the pile of the fabric exerts a biasing cushion action on disk 19 as it is carried on the velvet material 45 in tracks 29, 31. Both the biasing function and the cushioning effect can be adjusted by selection of the appropriate material, so that an appropriate biasing force is placed on disk 19 and it stays in the position where it is placed by the pilot.

In its simplest embodiment, disk 19 is carried by tracks 29 and 31 and can be removed for cleaning or replacement as needed. In the preferred embodiment, stops 47 are placed at the two longitudinal ends of visor 17, so that disk 19 will remain between the tracks and will not inadvertently be removed. Stops 47 can be designed so that disk 19 can be removed from tracks 29 and 31 by flexing either disk 19 or visor 17, or a combination of both.

Figure 13:
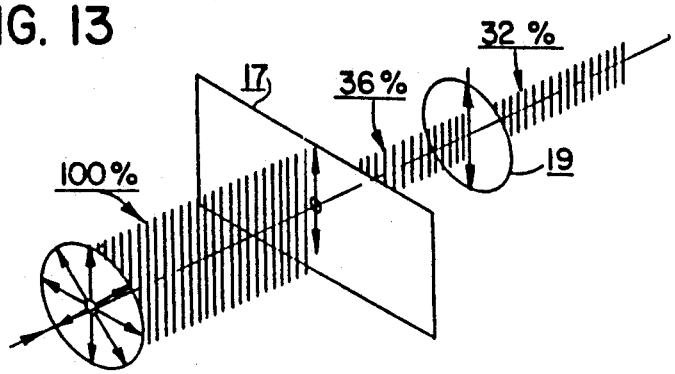
FIGS. 13, 14, and 15 are schematic, pictorial views, illustrating the operation of the present invention, showing the range of transmitted light reaching the pilot when used according to the present invention.
Figure 14:
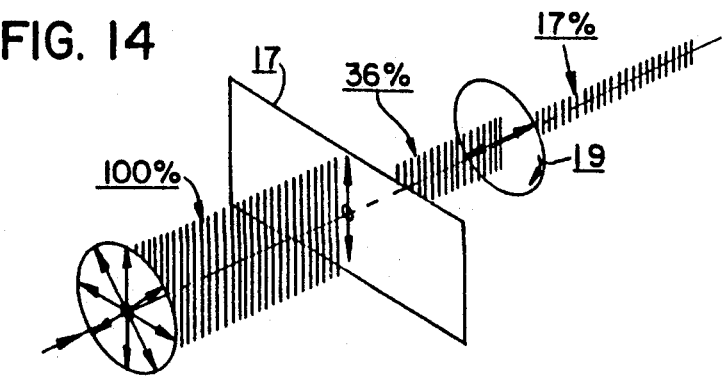
Figure 15:
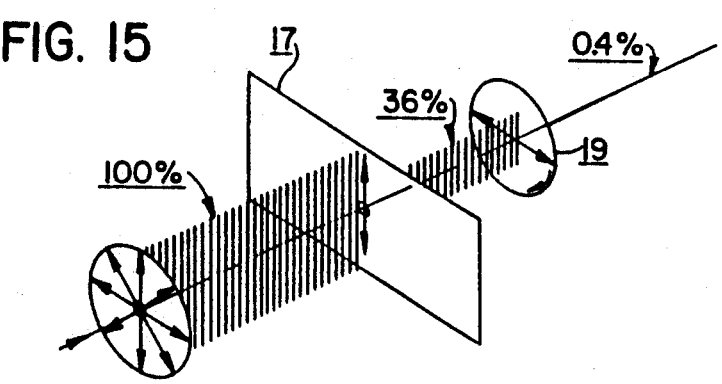

The efficiencies of the present invention are presented in FIGS. 13, 14, and 15. In each case there is a source of natural incident light 49, which would, of course, be the sun. One hundred percent of the natural incident light strikes the visor 17 and is polarized in the vertical plane. Only 36%, approximately, of the light which strikes visor 17 passes through it, and that light is, as stated, polarized in the vertical plane. Light which then impinges upon polarization disk 19, which functions as an analyzer, is further polarized, depending upon the orientation of disk 19. When disk 19 is in a vertical polarization, as shown in FIG. 13, most of the light striking disk 19 is passed through since it has already been polarized in that same vertical direction. Thus, 32% of the original natural incident light reaches the pilot's eyes when the pilot has aligned disk 19 and visor 17 with the sun or other source of natural incident light. This amount is still too bright and can cause visual aberrations or sun blindness.

If disk 19 is rotated to a position halfway between the vertical and horizontal polarization positions, as shown in FIG. 14, another significant amount of light is reduced. In FIG. 14, 17% of the original light from light source 49 has passed through both visor 17 and disk 19. This might be functionally appropriate on cloudy days or when other light sources other than the sun are of primary concern.

As shown in FIG. 15, a full rotation of disk 19 to a polarization in the position in the horizontal plane effectively eliminates the danger from sun blindness. Specifically, only 0.04% of the original natural incident light from source 49 passes through both visor 17 and disk 19 when disk 19 is in the horizontal polarization position. Yet, because the disk is sized to obscure only a small portion of the field of vision, safety is enhanced to the benefit of all.

There is shown in FIGS. 16-21 the preferred embodiment of the visor in accordance with the present invention. In accordance with this embodiment of the invention, the visor comprises a generally rectangular panel 50. Panel 50 is made of a transparent sheet of plain polarizing material preferably polarized as in the previous described embodiment in a vertical direction. The visor, as represented by the panel 50, is polarized in one axial plane, preferably the vertical plane and, as noted previously, substantially reduces the glare caused by reflection and natural light which pass there through.

In accordance with this embodiment of the invention, a pair of circular polarizing disks 52, 54 are mounted in side by side array and adapted for limited rotation relative to the panel 50. Disks 52, 54 are not at all obstructed in the center, providing maximized unobstructed viewing. To this end, in accordance with the preferred embodiment, panel 50 has two openings 55 on its upper edge for mounting the visor in a standard visor bracket 56 with clamp arm 57 shown in FIGS. 17 and 18 and fastened through openings 55 with bolts 58.

The disks 52, 54 are supported for limited rotation relative to panel 50, using three circumferentially space buttons for each disk, designated by the numeral 60a, 60b, 62a, 62b, 64a and 64b. Buttons 60a and 60b are fastened to the panel 50 using screws 61 and nuts 63, and are located at the top of panel 50 so that the disks 52, 54 can be inserted and secured. The buttons 62a, 62b, and 64a, 64b are located at the side and the lower edge of the panel, respectively. They are secured directly to the face of the panel by adhesive means 65 as shown in FIG. 21. All of the buttons 60a, 60b, 62a, 62b, 64a, 64b are made of an opaque material. The preferred material for the buttons is nylon filled with molybdnem disulfide for durability and for providing a lubricant factor.

The buttons as illustrated have a circumferentially spaced groove 61 of a dimension slightly greater than the thickness of disk 52, 54 to support the disk in spaced relation to the panel 50 in the manner shown in FIGS. 19 and 20 and thereby prevent scratching of the confronting surfaces of the disk and panel when in use.

Each disk 52, 54 mounts a knob 70a, 70b, respectively, made of opaque plastic material and located adjacent the outer periphery of the disk. Each knob 70a, 70b is located so that it engages a button 62a, 62b, respectively, at its outer limit 70c, 70d and a button 60a, 60b, respectively, at its extreme inner limit 70e, 70f positions so that angular rotation of the disk 52, 54 is limited to a rotation through the angle designated alpha. This range is just more than approximately 90° so that the disk 52, 54 and panel 50 can be rotated relative to one another from a position ranging from a maximum of approximately 32% of the natural incident light on the outside of the visor panel to the opposite limit position whereby only about a minimum of 0.04% of the natural incident light reaches the viewer's eyes.

Considering now the use of the visor in accordance with the present invention, with the knobs 70a, 70b, respectively, for the right disk 52 and left disk 54 in the vertical position the disk and panel polarization are aligned and the natural incident light striking the panel and disk is polarized in the vertical. However, only about 36% of the light which strikes the polarized visor passes through it.

That light is shown in the schematic of FIG. 13 polarized in the vertical plane. Light which then impinges upon the polarization disk 19, which functions as an analyzer, is further polarized depending upon the orientation of the disk. When the disks are in vertical polarization position as shown in FIG. 13, most of the light striking disk 19 is passed through since it has already been polarized in the same vertical direction. Accordingly, about 32% of the original natural incident light reaches the viewer's eyes with the disk in this position. As the disk 19 is rotated outwardly from this position, the amount of light passing through is significantly reduced. See FIG. 14. The maximum filtering occurring when the disk 19 is rotated to a position shown in FIG. 15, when the polarization of the disk 19 is approximately transverse to the polarization of the panel 17.

The present invention provides an advantage over the prior art because the particular configurations and arrangements of applicant's visor provides an essentially unobstructed viewing area for the pilot, thereby eliminating blind spots and latent images which could present a dangerous situation.

While a particular embodiment of the invention as been illustrated and described herein, it not intended to limit the invention and changes and modifications may be made therein within the scope of the following claims.

What is claimed is:

1. A sun visor device for use in the cockpit of aircraft, comprising:
   an optically active visor panel polarized in a first plane adapted to be mounted in operable relationship to the windshield in said cockpit; and
   a pair of polarized disks mounted in side by side relation on one side of said panel covering more than one half of the entire viewing area through said panel, and mounting means for rotatably mounting said disks in spaced relation to one face of said panel and actuator means for rotating said panel between limit positions to thereby permit minimum to maximum polarization by said disk and an unobstructed view through said disks and visor panel.

2. The device of claim 1 wherein said pair of disks cover at least 70% of the entire viewing area through said panel.

3. The device of claim 1 wherein said actuator means comprises an opaque button fixedly mounted to said disks and said mounting means comprises a plurality of button means for engagement with the periphery of said disks.

4. The device of claim 3 wherein said button means include slot means for slidably engaging said periphery of said disks.

5. The device of claim 1 wherein said actuator means and said mounting means combine to define said limit positions.

6. The device of claim 5 wherein said limit positions permit rotation of said disks about an angle greater than 90° to insure minimum to maximum polarization by said disks.

7. A sun visor device for use in the cockpit of aircraft, comprising:
   an optically active visor panel polarized in a first plane adapted to be mounted in operable relationship to the windshield in said cockpit; and
   a pair of polarized disks mounted in side by side relation on one side of said panel covering at least 70% of the entire viewing area through said panel, a plurality of opaque button means for a rotatably mounting said disks in spaced relation to one face of said panel and an opaque actuator button for rotatably mounting said panel between limit positions defined by said button means and actuator button to thereby permit minimum to maximum polarization by said disk and an unobstructed view through said disks and visor panel.

8. The device of claim 7 wherein said button means include slot means for slidably engaging the periphery of said disks.

9. The device of claim 7 wherein said limit positions permit rotation of said disks about an angle greater than 90° to insure minimum to maximum polarization by said disks.

* * * * *